United States Patent
Karikomi et al.

(10) Patent No.: US 7,607,827 B2
(45) Date of Patent: Oct. 27, 2009

(54) TEMPERATURE DETECTION DEVICE, TEMPERATURE DETECTION METHOD, AND COMPUTER-READABLE COMPUTER PROGRAM PRODUCT CONTAINING TEMPERATURE DETECTION PROGRAM

(75) Inventors: Takaaki Karikomi, Sagamihara (JP); Ken Ito, Machida (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 435 days.

(21) Appl. No.: 11/076,206

(22) Filed: Mar. 10, 2005

(65) Prior Publication Data

US 2005/0204761 A1  Sep. 22, 2005

(30) Foreign Application Priority Data

Mar. 19, 2004  (JP) ............... 2004-081572

(51) Int. Cl.
*H02H 3/00* (2006.01)
*G01K 7/00* (2006.01)

(52) U.S. Cl. .................. 374/141; 374/178; 374/5; 361/93.8

(58) Field of Classification Search ............. 374/4, 374/5, 141, 142, 152, 153, 163, 183, 165, 374/169, 178, 100; 62/228.1; 123/339.24, 123/41.05; 361/24–25, 30–31, 33, 37, 78, 361/79, 93.8, 100, 106, 103, 688, 687; 318/565
See application file for complete search history.

(56) References Cited

U.S. PATENT DOCUMENTS

| | | | | |
|---|---|---|---|---|
| 4,982,143 A | * | 1/1991 | Gerschner et al. | 318/471 |
| 5,140,302 A | * | 8/1992 | Hara et al. | 340/449 |
| 5,543,998 A | * | 8/1996 | Higashiyama | 361/103 |
| 5,708,352 A | * | 1/1998 | Umeda et al. | 322/28 |
| 5,825,642 A | * | 10/1998 | Ishii et al. | 363/141 |
| 5,923,135 A | | 7/1999 | Takeda | |
| 5,977,742 A | * | 11/1999 | Henmi | 318/801 |
| 6,016,965 A | * | 1/2000 | Yoshimura et al. | 236/35 |
| 6,046,563 A | * | 4/2000 | Moreyra | 318/139 |
| 6,104,149 A | * | 8/2000 | Pelly | 318/400.21 |
| 6,595,005 B1 | * | 7/2003 | Immel | 62/3.7 |
| 6,854,881 B2 | * | 2/2005 | Nada | 374/169 |
| 7,035,064 B2 | * | 4/2006 | Schimanek et al. | 361/23 |
| 7,113,376 B2 | * | 9/2006 | Nomura et al. | 361/31 |
| 7,176,804 B2 | * | 2/2007 | Norrena et al. | 340/588 |
| 7,199,549 B2 | * | 4/2007 | Kleinau et al. | 318/798 |
| 7,236,337 B2 | * | 6/2007 | Minatani | 361/23 |
| 7,379,285 B2 | * | 5/2008 | Asada | 361/103 |

(Continued)

FOREIGN PATENT DOCUMENTS

JP    63001393 A  *  1/1988

(Continued)

*Primary Examiner*—Gail Verbitsky
(74) *Attorney, Agent, or Firm*—Foley & Lardner LLP (57) ABSTRACT

Heating value P[W] generated at an IGBT is calculated, and a temperature difference $\Delta T_j$ [° C.] between a temperature $T_w$ [° C.] of cooling water circulating in a cooling system and a temperature $T_j$ [° C.] of an IGBT is calculated based on thermal resistance R [° C./W] of the cooling system. A temperature rise $\Delta T'_j$ [° C.] with transient influences eliminated is then calculated based on the calculated temperature difference $\Delta T_j$ [° C.], and the temperature $T_j$ [° C.] (=$T_w$ [° C.]+$\Delta T'_j$ [° C.]) of the IGBT is calculated.

10 Claims, 8 Drawing Sheets

U.S. PATENT DOCUMENTS

| | | | |
|---|---|---|---|
| 2003/0090873 A1* | 5/2003 | Ohkouchi | 361/704 |
| 2003/0206574 A1 | 11/2003 | Yun | |
| 2004/0105286 A1* | 6/2004 | Jahkonen et al. | 363/98 |
| 2004/0207968 A1* | 10/2004 | Martin et al. | 361/100 |
| 2006/0215341 A1* | 9/2006 | Sakurai et al. | 361/100 |
| 2008/0055799 A1* | 3/2008 | Serizawa et al. | 361/24 |

FOREIGN PATENT DOCUMENTS

| | | | |
|---|---|---|---|
| JP | 04289798 A * | 10/1992 | |
| JP | 07-135731 A | 5/1995 | |
| JP | 08204076 A * | 8/1996 | |
| JP | 10-164703 A | 6/1998 | |
| JP | 2000-134074 A | 5/2000 | |
| JP | 2001-318008 A | 11/2001 | |
| JP | 2003-009541 | 1/2003 | |
| JP | 2003-018861 A | 1/2003 | |
| JP | 2003-189668 A | 7/2003 | |
| JP | 2003-204028 A | 7/2003 | |

* cited by examiner

TEMPERATURE DETECTION DEVICE, TEMPERATURE DETECTION METHOD, AND COMPUTER-READABLE COMPUTER PROGRAM PRODUCT CONTAINING TEMPERATURE DETECTION PROGRAM

BACKGROUND OF THE INVENTION

1. Field of the Invention

The present invention relates to a temperature detection device that detects a temperature of a semiconductor module etc., a temperature detection method, and a computer-readable computer program product containing a temperature detection program.

2. Description of Related Art

Power converters where inverters are made up of semiconductor switching elements etc. are used in electrical vehicles, etc. With this kind of electrical converter, it is necessary to detect the temperature of the semiconductor module in order to prevent the temperature of the semiconductor module from rapidly rising. In Japanese Laid Open Patent Publication No. 2000-134074, temperature detection diodes and temperature detection circuits are provided for each of the six semiconductor elements constituting a semiconductor module.

SUMMARY OF THE INVENTION

However, if temperature detection elements and circuits are provided for semiconductor elements taken as subjects of temperature detection, this causes the size and cost of the temperature detection device to increase in accompaniment with an increase in the number of parts.

A temperature detection device in the invention includes a cooling medium temperature calculation device that calculates a temperature of a cooling medium in a cooling system in which a temperature detection subject driven at a prescribed driving ratio is cooled, and a temperature calculation device that calculates a temperature of the temperature detection subject based on drive information for the temperature detection subject, thermal resistance between the temperature detection subject and the cooling medium, and the temperature of the cooling medium calculated by the cooling medium temperature calculation device.

A temperature detection method in the invention includes the steps of calculating a temperature of a cooling medium in a cooling system in which a temperature detection subject driven at a prescribed driving ratio is cooled, and calculating temperature of a temperature detection subject based on drive information for the temperature detection subject, thermal resistance between the temperature detection subject and the cooling medium, and the temperature of the cooling medium.

A computer-readable computer program product in the invention contains a temperature detection program. The temperature detection program includes a process for calculating amount of heat occurring at a temperature detection subject, a process for calculating a temperature difference between the temperature detection subject and a cooling medium based on calculated amount of heat and thermal resistance between the temperature detection subject and the cooling medium in a cooling system in which the temperature detection subject is cooled, a process for excluding a transient response component of the cooling system from the calculated temperature difference, and a process for calculating the temperature of the temperature detection subject by adding the temperature difference from which the transient response component is excluded to the temperature of the cooling medium.

DETAILED DESCRIPTION OF THE PREFERRED EMBODIMENTS

First Embodiment

Figure 1:
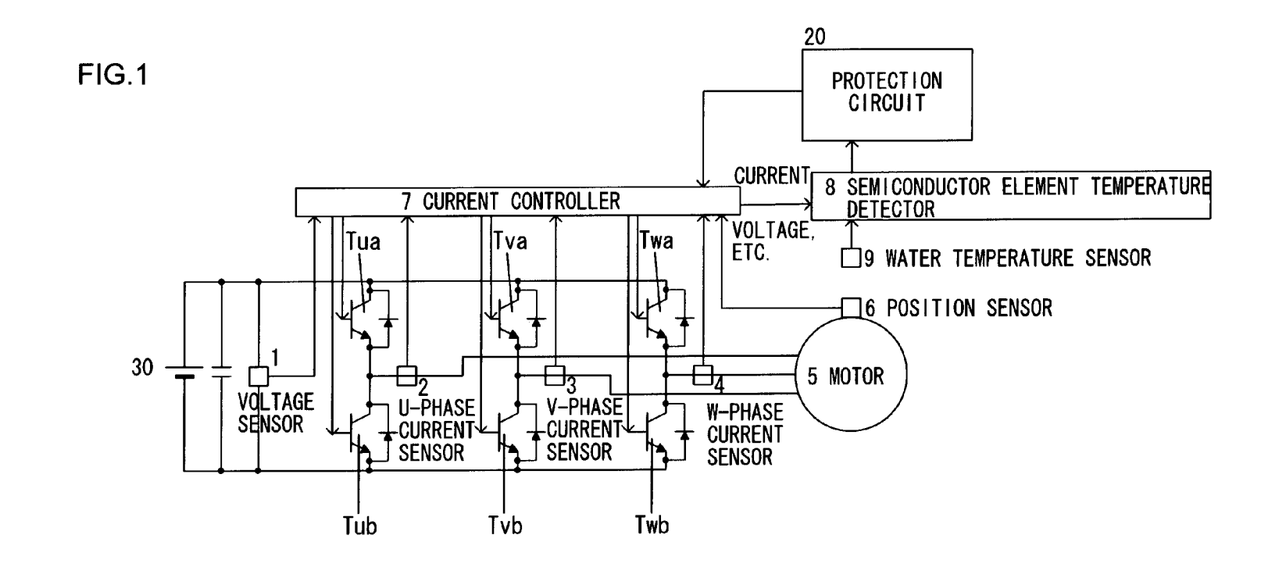
FIG. 1 is a structural view of the essential parts of an electrical vehicle mounted with a temperature detection device in a first embodiment according to the present invention.

FIG. 1 is a view showing the essential parts of an electrical vehicle mounted with a temperature detection device in a first embodiment according to the present invention. In FIG. 1, a semiconductor module is configured from six insulated gate-type bipolar transistors (IGBT) Tua, Tub, Tva, Tvb, Twa and Twb. The semiconductor module composes an inverter for supplying electrical power to a motor 5 constituting a driver source for a vehicle. The direct current power of the battery 30 is converted to three-phase current power by switching each of the IGBTs at prescribed carrier frequencies. The three phases correspond to the U-phase, V-phase and W-phase, with IGBT Tua and Tub constituting the U-phase, IGBT Tva and Tvb constituting the V-phase, and IGBT Twa and Twb constituting the W-phase.

A voltage sensor 1 detects direct-current voltage applied to each phase of the semiconductor module. The detected voltage value is sent to a current controller 7. A U-phase current sensor 2 detects current flowing in the U-phase line of the semiconductor module. A V-phase current sensor 3 detects current flowing in the V-phase line of the semiconductor module. A W-phase current sensor 4 detects current flowing in the W-phase line of the semiconductor module. The direct current values detected by each of the current sensors 3 to 5 are sent to the current controller 7.

A position sensor 6 detects the position of a rotor of a motor 5. A position detection signal output from the position sensor 6 is sent to the current controller 7. The current controller 7 performs switching of the semiconductor module according to a current target value and performs drive control on the motor 5. Specifically, current flowing in each phase of the semiconductor module is resolved to two orthogonal axes components of a component $i_d$ for a magnetic axis or minimum axis for inductance, and a component $i_q$ for a magnetic orthogonal axis or maximum axis for inductance, and vector control controlling current as a vector is carried out. An orthogonal coordinate system constituted by the d-axis and the q-axis is then a coordinate system rotating in synchronization with rotation of the motor 5.

The current controller 7 sends current values flowing in each phase of the semiconductor module, direct-current voltage values applied to the semiconductor module, and drive information (ON time ratio etc.) for each IGBT (Tua, Tub, Tva, Tvb, Twa and Twb) etc. to a semiconductor element temperature detector 8.

The semiconductor module is cooled by a water-type cooling system (not shown). A water temperature sensor 9 detects the temperature of cooling water re-circulating within the cooling system and in particular detects the temperature of cooling water at the position where the water temperature sensor 9 is located. Temperatures detected by the water temperature sensor 9 are then sent to the semiconductor element temperature detector 8. The temperature detection position of the water temperature sensor 9 is, for example, taken to be in the vicinity of the inflow of cooling water circulating in the cooling system to the semiconductor module.

The semiconductor element temperature detector 8 then calculates each IGBT temperature based on current values flowing in each phase of the semiconductor module sent from the current controller 7, direct-current voltage values applied to the semiconductor module, water temperature detected by the water temperature sensor 9, and drive information for each IGBT sent from the current controller 7. The semiconductor element temperature detector 8 sends an abnormal temperature signal to a protection circuit 20 when the detection temperature of the IGBT exceeds a prescribed determination threshold value.

When an abnormal temperature signal is input from the semiconductor element temperature detector 8, the protection circuit 20 executes a fail-safe operation that outputs an instruction to the current controller 7 to lower the carrier frequency and reduce the current flowing in the IGBT.

The present invention has a characteristic temperature detection operation carried out by the semiconductor element temperature detector 8. In the first embodiment, the semiconductor element temperature detector 8 calculates each IGBT temperature for each period corresponding to the range of rotational speed of the motor 5. In the event of detecting up to a maximum rotational speed, it is necessary to perform a calculation every carrier period (for example, 100 μsecs), and in the event of detecting just a low rotational speed, it is possible to calculate using a period slower than the carrier period based upon the rotational speed. However, this is taken to be greater than a lowest calculation period (for example, 50 msec) decided based upon a transition model time constant described later. In this example, a calculation period is described as 100 μsecs.

Figure 2:
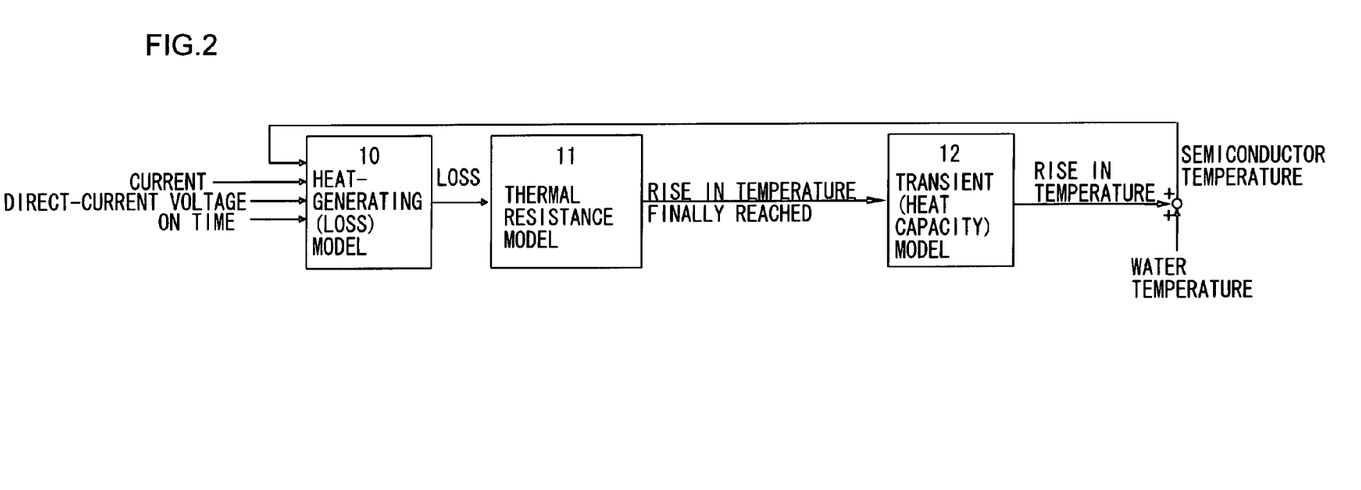
FIG. 2 is a block view illustrating a configuration for a semiconductor element temperature detector.

FIG. 2 is a block view illustrating a configuration for a semiconductor element temperature detector 8. In FIG. 2, the semiconductor element temperature detector 8 includes a heat-generating (loss) model 10, a thermal resistance model 11 and a transient (heat capacity) model 12. The heat-generating model 10 calculates the amount of heat generated by the IGBTs, i.e. calculates IGBT loss.

A heating value P[W] is calculated based on current values flowing in each phase of the semiconductor module, direct-current voltage values applied to the semiconductor module, drive information for each IGBT and IGBT temperature detected for the previous time (in this example, 100 μsecs previous). The current value is used as phase current corresponding to the IGBT constituting the temperature detection target. The IGBT drive information constituted by the temperature detection target is used as the IGBT drive information.

The heating value P[W] is expressed as the sum of the loss $P_{sat}$ and the switching loss $P_{sw}$ as shown in the following equation (1).

$$P[W]P_{sat}+P_{sw}. \tag{1}$$

The loss $P_{sat}$ [W] that is the first term of equation (1) following equation (2).

$$P_{sat}[W]=i \cdot V_{ce} \cdot t_{ON} \tag{2}$$

Here, i[A] is collector current of IGBT constituting the temperature detection target. The collector current i [A] is taken to be as follows according to the value of the phase current (i'[A]) detected by the current sensor. In the event that the IGBT constituting the temperature detection target constitutes an upper arm, if i'≧0, then it is taken that i=i', and if i'<0, it is taken that i=0. In the event that the IGBT constituting the temperature detection target constitutes a lower arm, if i'≧0, then it is taken that i=0, and if i'<0, it is taken that i=−i'. Here, $t_{on}$ is the on-time ratio of IGBT constituting the temperature detection target, and is any value from 0 to 1. It is also possible to take $t_{on}$ to be a fixed value 0.5 when the motor 5 is rotating at low speed (when the number of rotations per unit time is less than a prescribed number). The rotational speed (number of rotations) of the motor 5 is detected based on the detection signal output from the position sensor 6 or the fluctuation period of the phase current flowing through the semiconductor module.

A voltage $V_{ce}$ [V] across the collector and emitter of the IGBT in equation (2) is expressed by the following equation (3).

$$V_{ce}\ [V] = V_{ce0} + \frac{V_{ce(sat)} - V_{ce0}}{k_0} \cdot i \tag{3}$$

Figure 3:
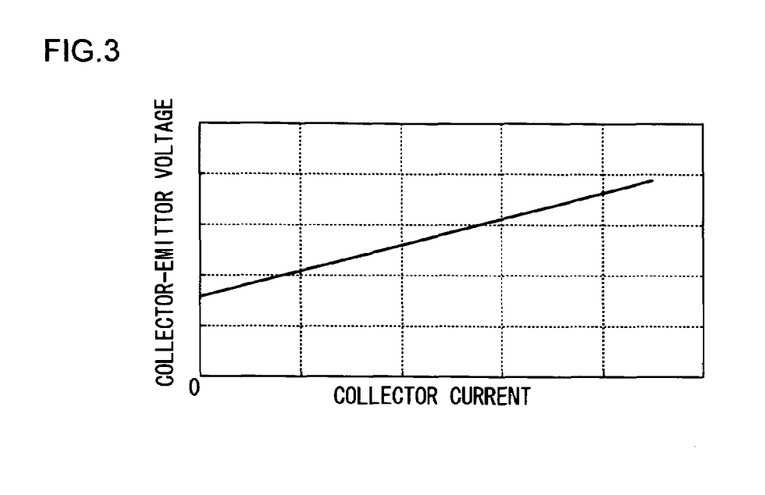
FIG. 3 is a view showing the relationship between collector current and collector-emitter voltage.

Here, $V_{ce0}$ [V] is the collector-emitter voltage when the collector current i=0[A], and $V_{ce(sat)}$ [V] is the collector-emitter voltage when the collector current i=$k_0$[A]. FIG. 3 is a view showing the relationship between the collector current flowing at a certain semiconductor element temperature and the collector-emitter voltage $V_{ce}$ expressed by equation (3). According to FIG. 3, the collector-emitter voltage $V_{ce}$ rises as the collector current increases.

Figure 4:
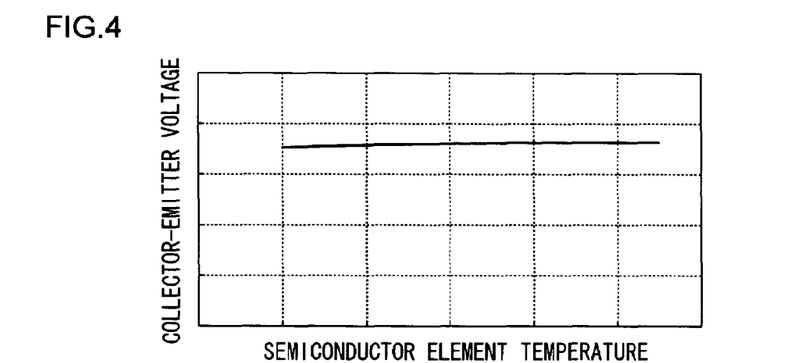
FIG. 4 is a view showing the relationship between semiconductor element temperature and collector-emitter voltage.

The collector-emitter voltage $V_{ce}$ changes depending on the semiconductor element temperature. FIG. 4 is a view showing the relationship between semiconductor element temperature and collector-emitter voltage $V_{ce}$ at a certain semiconductor element temperature. The scale of the vertical axis in FIG. 4 and the scale of the vertical axis in FIG. 3 are not the same. According to FIG. 4, the collector-emitter voltage $V_{ce}$ rises slightly as the semiconductor element temperature rises.

When the collector-emitter voltage $V_{ce0}$ incorporated in equation (3) is expressed as a function of the semiconductor element temperature (i.e. the temperature of IGBT taken as the temperature detection target), the following equation (4) is obtained. This equation is obtained experimentally based on measurement data and is stored in advance within memory of the semiconductor element temperature detector 8.

$$V_{ce0}[V] = k_2 \cdot T_j + k_3 \quad (4)$$

$k_2$ and $k_3$ are coefficients obtained through experimentation. $T_j$ [° C.] is the temperature of the IGBT detected for the previous time (100 μsecs before in this example). The semiconductor element temperature detector 8 then substitutes the results of calculation of equation (4), i.e. $V_{ce0}$, into equation (3). The semiconductor element temperature detector 8 is capable of obtaining a collector-emitter voltage $V_{ce0}$ corresponding to semiconductor element temperature $T_j$ by performing the calculation of equation (4) using the semiconductor element temperature $T_j$ (i.e. the temperature of the IGBT detected for the previous time).

When the collector-emitter voltage $V_{ce(sat)}$ incorporated in equation (3) is expressed as a function of the semiconductor element temperature (i.e. the temperature of IGBT taken as the temperature detection target), the following equation (5) is obtained. This equation is also obtained experimentally and is stored in advance within memory of the semiconductor element temperature detector 8.

$$V_{ce(sat)}[V] = k_4 \cdot T_j^2 + k_5 \cdot T_j + k_6 \quad (5)$$

Where $k_4$, $k_5$ and $k_6$ are coefficients obtained through experimentation. $T_j$ [° C.] is the temperature of the IGBT detected for the previous time (100 μsecs before in this example). The semiconductor element temperature detector 8 then substitutes the results of calculation of equation (5), i.e. $V_{ce(sat)}$, into equation (3). The semiconductor element temperature detector 8 is capable of obtaining a collector-emitter voltage $V_{ce(sat)}$ corresponding to semiconductor element temperature $T_j$ by performing the calculation of equation (5) using the semiconductor element temperature $T_j$ (i.e. the temperature of the IGBT detected for the previous time).

Figure 5:
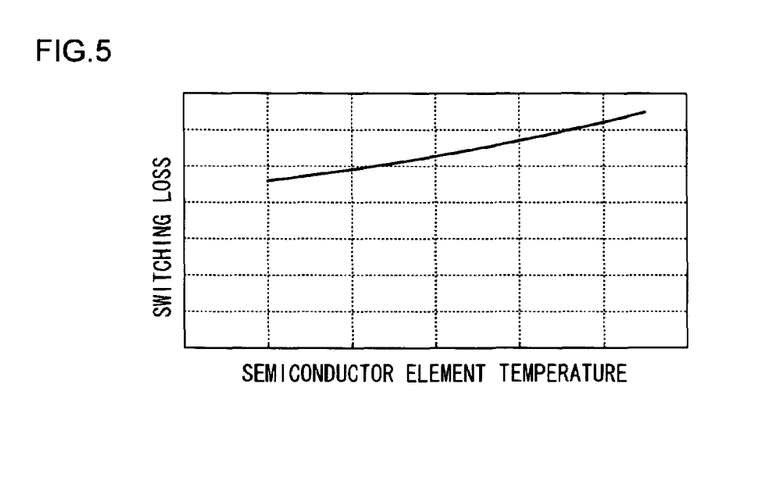
FIG. 5 is a view showing the relationship between semiconductor element temperature and switching loss.

On the other hand, switching loss $P_{sw}$ that is the second term of equation (1) can be expressed by the following equation (6).

$$P_{sw}[W] = f_c \cdot E_{sw(sat)} \cdot \frac{i}{k_1} \quad (6)$$

where $f_c$[Hz] is switching frequency. $E_{sw(sat)}$ [J] is switching loss when collector current $i = k_1$[A]. The switching loss has a characteristic of increasing together with increases in the semiconductor element temperature. FIG. 5 is a view showing the relationship between semiconductor element temperature and switching loss $E_{sw(sat)}$.

The switching element $E_{sw(sat)}$ as shown in FIG. 5 is expressed in the following equation (7) as a function of temperature of an IGBT constituting a temperature detection target. This equation is obtained experimentally based on measurement data and is stored in advance within memory of the semiconductor element temperature detector 8.

$$E_{sw(sat)}[J] = \{k_7 \cdot e^{k_8 \cdot T_j} \cdot V_{dc} - (k_9 \cdot T_j + k_{10})\} \times 10^{-3} \quad (7)$$

Where $k_7$, $k_8$, $k_9$ and $k_{10}$ are coefficients obtained through experimentation. $T_j$ [° C.] is the temperature of the IGBT detected for the previous time (100 μsecs before in this example). $V_{dc}$[V] is a direct-current voltage value applied to the semiconductor module. The semiconductor element temperature detector 8 then substitutes the results of calculations of equation (7) into equation (6).

As described in the above, the semiconductor element temperature detector 8 calculates the heating value P[W] of the IGBT constituting the target of temperature detection by performing the calculations of equation (1) to equation (7).

The thermal resistance model 11 calculates a temperature difference $\Delta T'_j$ [° C.] between a cooling water temperature $T_w$ [° C.] detected by the water temperature sensor 9 and the temperature of the IGBT constituting the temperature detection target based upon the heating value P[W] of the IGBT constituting the temperature detection target and thermal resistance R [° C./W] of the cooling system.

Figure 6:
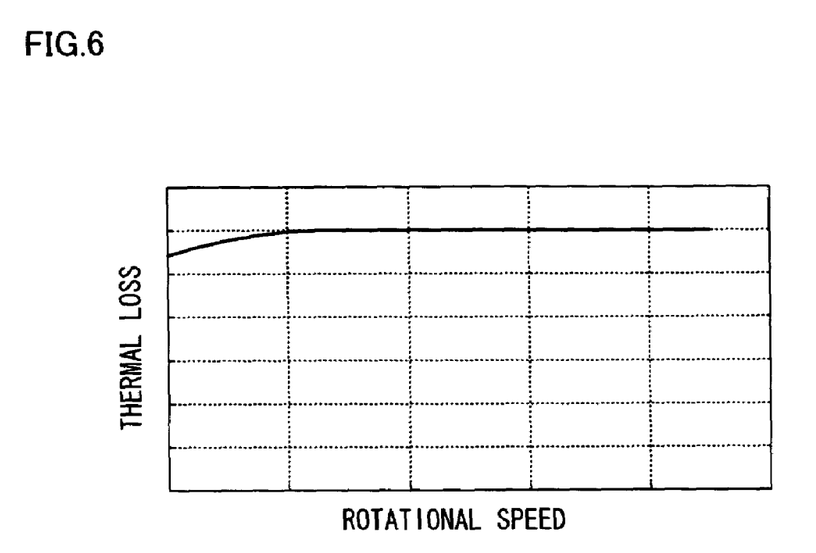
FIG. 6 is a view showing an example of the relationship between rotational speed of a motor and thermal resistance.

The thermal resistance R [° C./W] is a value corresponding to the rotational speed (rotational speed per unit time) of the motor 5. FIG. 6 is a view showing an example of the relationship between rotational speed and thermal resistance R1. According to FIG. 6, the thermal resistance R1 rises together with increase in rotational speed, and when a prescribed rotational speed is reached, the thermal resistance becomes a substantially fixed value. The thermal resistance R1 depending on the rotational speed as shown in FIG. 6 is measured in advance, and the measured data is stored in memory (not shown) within the semiconductor element temperature detector 8. The semiconductor element temperature detector then acquires a signal corresponding to the rotational speed of the motor 5 from the current controller 7, refers to data stored in memory, and obtains a thermal resistance R1 corresponding to the rotational speed.

Because errors exist in the thermal model, the thermal resistance R [° C./W] is changed according to the heating value P[W] of the IGBT constituting the target of temperature detection. In the example of the relationship between the generated heat (loss) and thermal resistance R2, the thermal resistance R2 rises together with increases in the heating value P. The thermal resistance R2 dependent on the amount of generated heat is measured in advance, and the measured data is stored in memory (not shown) within the semiconductor element temperature detector 8. The semiconductor element temperature detector 8 then refers to data stored in the memory using the heating value P[W] calculated using the heat-generating (loss) model 10 and obtains thermal resistance R2 corresponding to the heating value P[W].

For ease of description, a description is given where table data for the thermal resistance R1 and table data for the thermal resistance R2 are respectively provided at the semiconductor element temperature detector 8. However, in reality, a two-dimensional table is configured for the thermal resistance R1 and the thermal resistance R2. The semiconductor element temperature detector 8 refers to the two-dimensional table based upon the rotational speed of the motor 5 and the heating value P, and obtains thermal resistance R [° C./W] corresponding to the rotational speed and the heating value P.

The semiconductor element temperature detector 8 then calculates temperature difference $\Delta T'_j$ [° C.] occurring due to the heating value P[W] by performing the calculation of the following equation (8). $\Delta T'_j$ [° C.] is referred to as the final rise in temperature attained for the IGBT for which the temperature is detected.

$$\Delta T'_j [° C.] = R \cdot P \quad (8)$$

The transient (heat capacity) model 12 calculates the temperature rise $\Delta T_j$ [° C.] of an IGBT which is the target of temperature detection by compensating for the transient temperature characteristics of the temperature detection device occurring after applying current to the semiconductor module. $\Delta T_j$ [° C.] is a value which is obtained by removing transitory influences after current-applying from the calculated temperature difference $\Delta T'_j$ [° C.].

The temperature of IGBT and the temperature of cooling water are same prior to starting excitation of the semiconductor module. After the commencement of applying current to the semiconductor module, a temperature difference between the IGBT and the cooling water occurs according to the heating value P[W] at the IGBT. When the heating value P[W] is fixed, this temperature difference increases from the start of current-applying, and is equal to $\Delta T_j$ [° C.] after thermal equilibrium is reached.

Figure 7:
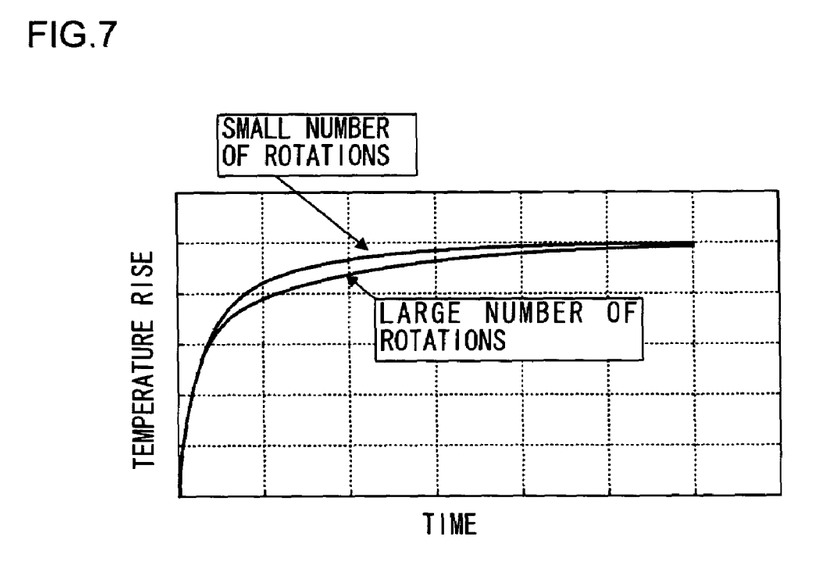
FIG. 7 is a view showing an example of the relationship between time elapsed from the start of energizing and rise in temperature.

FIG. 7 is a view showing an example of the relationship between time elapsed from the start of current-applying and rise in temperature. According to FIG. 7, directly after the start of current-applying, the rate of the rise in temperature becomes high, the rate of increase in temperature lessens with the course of time and then converges. In FIG. 7, when the temperature increase curve in the case where the rotational speed of the motor 5 is low and the temperature increase curve in the case where the rotational speed is high are compared, the curve in the case where the rotational speed is small converges more quickly than the curve in the case where the rotational speed is high.

The curve shown in FIG. 7 is obtained by curve-fitting pre-measured data. The relationship of the following equation (9) is fulfilled between the temperature increase $\Delta T_j$ [° C.] for an IGBT and the final rise in temperature $\Delta T'_j$ [° C.].

$$\Delta T_j(s) = \frac{b_2 s^2 + b_1 s + a_0}{s^2 + a_1 s + a_0} \Delta T'_j(s) \tag{9}$$

where "s" is a Laplace operator, and $a_1$, $a_0$, $b_0$ and $b_1$ are coefficients obtained through experimentation. The semiconductor element temperature detector 8 then carries out the filter operations expressed by equation (9) on the temperature difference $\Delta T'_j$ [° C.] calculated above and obtains a temperature rise $\Delta T_j$ [° C.] taking into consideration transient influences.

Equation (9) is stored in advance in memory within the semiconductor element temperature detector 8. In reality, a plurality of equations corresponding to the rotational speed of the motor 5 are stored. The semiconductor element temperature detector 8 selects an equation according to the rotational speed of the motor 5 and obtains a temperature rise $\Delta T_j$ [° C.] using the selected equation.

The semiconductor element temperature detector 8 adds the water temperature $T_w$ [° C.] detected by the water temperature sensor 9 and the temperature rise $\Delta T_j$ [° C.] obtained for the IGBT constituting the temperature detection target, and the temperature $T_j$ [° C.] of the IGBT constituting the target of temperature detection is obtained.

$$T_j[° C.] = T_w[° C.] + \Delta T_j[° C.] \tag{10}$$

The semiconductor element temperature detector 8 repeats the calculation of the temperature of the IGBT described above for each IGBT every carrier period and transmits the calculation results to the protection circuit 20. Each IGBT temperature obtained in these calculations are used in temperature detection calculations for the IGBTs the next time (equations (4), (5) and (7)).

The temperature detection method carried out by the temperature detection device in the first embodiment is collected as follows.

(1) The semiconductor element temperature detector 8 in the temperature detection device calculates the heating value P[W] generated at the IGBT constituting the target of temperature detection (heat-generating (loss) model 10), and calculates the temperature difference $\Delta T_j$ [° C.] between the cooling water temperature $T_w$ [° C.] circulating in the cooling system and the temperature $T_j$ [° C.] of the IGBT (thermal resistance model 11) based upon the thermal resistance R [° C./W] of the cooling system. Calculation of a heating value P[W] is carried out based on current values flowing in each phase of the semiconductor module, direct-current voltage values applied to the semiconductor module, drive information for each IGBT and IGBT temperature detected for the previous time (for example, 100 μsecs previous). According to this method, it is possible to obtain temperature of the IGBT without providing a temperature sensor directly at the IGBTs. It is therefore necessary to only provide one temperature sensor even for semiconductor modules constituted by a plurality of IGBTs. This means that it is possible to make a semiconductor module both smaller and cheaper compared to the case where temperature sensors are provided for each IGBT.

(2) Equation (4) and equation (5) are set in such a manner that fluctuations in the heating value due to changes in the collector-emitter voltage $V_{ce}$ caused by changes in the temperature $T_j$ of the IGBT are compensated for while calculating the heating value P[W]. It is therefore possible to accurately calculate the heating value P[W]. As a result, the precision of calculation of the temperature difference $\Delta T'_j$ [° C.] is increased and the precision of calculating the temperature of the IGBT is also increased.

(3) Equation (7) is set in such a manner that fluctuations in the heating value P[W] due to changes in the switching loss $E_{sw(sat)}$ caused by changes in the temperature $T_j$ of the IGBT are compensated for while calculating the heating value. It is therefore possible to accurately calculate the heating value P[W]. As a result, the precision of calculation of the temperature difference $\Delta T'_j$ [° C.] is increased and the precision of calculating the temperature of the IGBT is also increased.

(4) The thermal resistance R is also compensated according to respective changes in the rotational speed of the motor 5 and in the heating value P[W] of the IGBT constituting the target of temperature detection. As a result, the precision of calculation of the temperature difference $\Delta T'_j$ [° C.] is improved and the precision of calculation of the IGBT temperature is improved.

(5) The equation (9) is set in such a manner as to eliminate transient influences after starting applying current to the semiconductor module so as to obtain a temperature rise $\Delta T_j$ [° C.] for which transient influences are eliminated from the calculated temperature difference $\Delta T'_j$ [° C.] (transient (heat capacity) model 12). It is therefore possible to accurately obtain the temperature $T_j$ [° C.] (=$T_w$ [° C.]+$\Delta T_j$ [° C.]) of an IGBT directly after start of current-applying.

(6) Since the temperature is calculated for each IGBT, it is therefore possible to accurately obtain the temperature $T_j$ [° C.] of an IGBT even when a transient temperature rises for just one IGBT due to the motor 5 locking.

A description is given of an example of detecting the temperature of cooling water circulating in the cooling system using a water temperature sensor 9 for detecting the temperature of cooling water flowing into the semiconductor module. However, the cooling water temperature may also be detected at other locations such as the semiconductor module or the side of outflow from the semiconductor module. However, to exclude locations where the cooling water temperature fluctuates due to heating sources or cooling sources other than the semiconductor module, in cases where a heat source or cooling source is present on the front side or rear side of the semiconductor module on a cooling water path, it is preferable to detect the temperature of cooling water on the semiconductor module side rather than the vicinity of the heat source or cooling source on the cooling water path.

Second Embodiment

Figure 8:
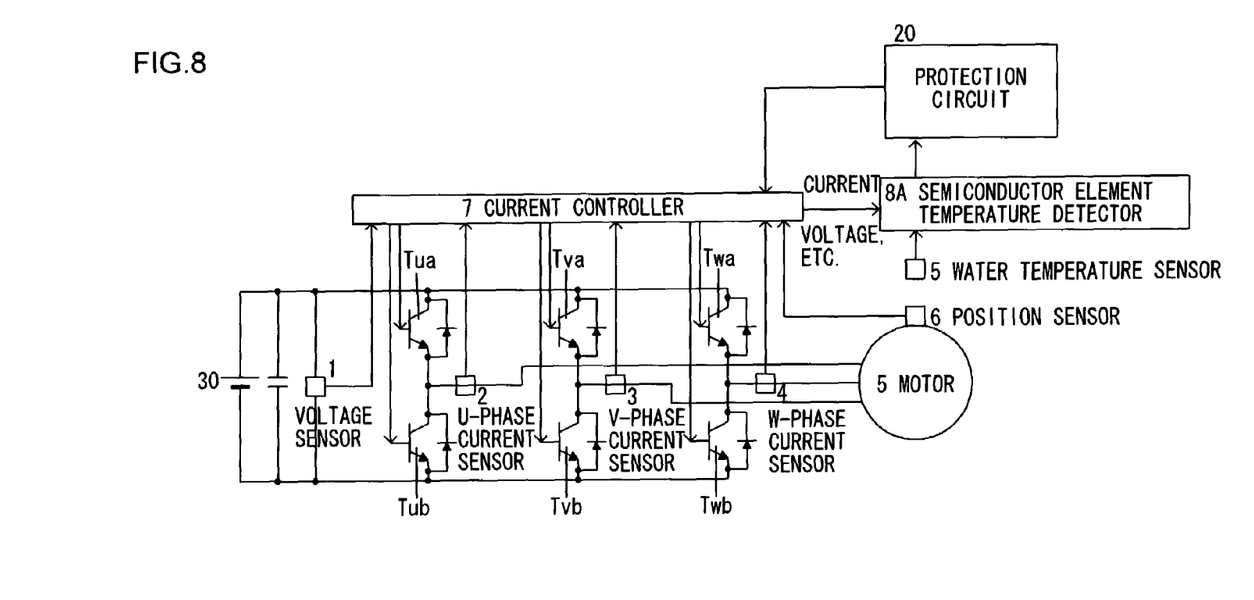
FIG. 8 is a structural view of the essential parts of an electrical vehicle mounted with a temperature detection device in a second embodiment according to the present invention.

FIG. 8 is a structural view describing the essential parts of an electrical vehicle mounted with a temperature detection device in a second embodiment according to the present invention. In FIG. 8, the same numeral numbers are assigned to components similar to those shown in FIG. 1 and the detailed explanation is omitted. The point of distinction with FIG. 1 is that a semiconductor element temperature detector 8A is provided in place of the semiconductor element temperature detector 8.

Figure 9:
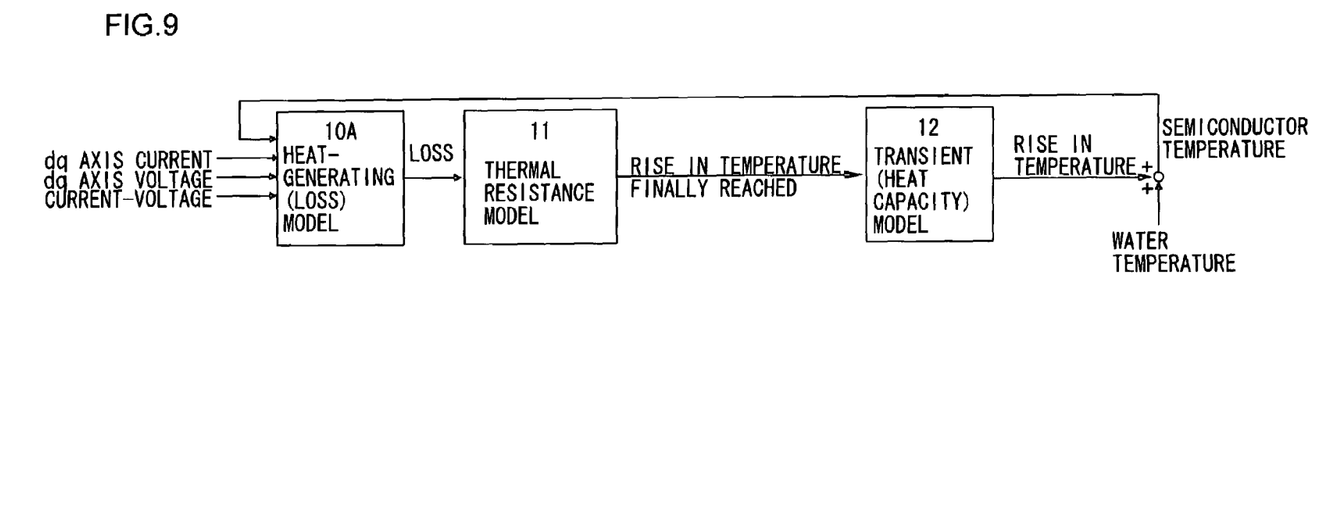
FIG. 9 is a block view illustrating a configuration for a semiconductor element temperature detector.

FIG. 9 is a block view illustrating a configuration for a semiconductor element temperature detector 8A. In FIG. 9, the semiconductor element temperature detector 8A includes a heat-generating (loss) model 10A, a thermal resistance model 11 and a transient (heat capacity) model 12. The semiconductor element temperature detector 8A detects the temperature of each IGBT at respective minimum operation periods (for example, 50 msecs) decided based on a time constant for the transient model. The thermal resistance model 11 and the transient (heat capacity) model 12 have the same configuration respectively as for FIG. 2 and description thereof is therefore omitted.

The heat-generating model 10A calculates the amount of heat generated at the IGBTs, i.e. calculates IGBT loss as follows. The heating value P[W] is calculated as follows based on the current values for the d-axis and q-axis, the voltage values for the d-axis and q-axis, the direct-current voltage value applied to the semiconductor module, and the IGBT temperature detected for the previous time (10 μsecs previous in this example). It is to be noted that the current value is used for calculation as phase current corresponding to the IGBT constituting the temperature detection target. The IGBT drive information constituted by the target of temperature detection is used for calculation as the IGBT drive information.

The loss $P_{sat}$[W] that is the first term of equation (1) can be expressed by the following equation (11).

$$P_{sat}\ [W] = \sqrt{\frac{2}{3}}\, i_a \cdot V_{ce0} \cdot \left(\frac{1}{2\pi} + \frac{D}{4\sqrt{3}} \cdot \cos\theta\right) + \tag{11}$$
$$\frac{2}{3} i_a^2 \cdot \frac{V_{ce(sat)} - V_{ce0}}{k_0} \cdot \left(\frac{1}{8} + \frac{2D}{3\sqrt{3}\,\pi} \cdot \cos\theta - \right.$$
$$\left. \frac{3D \cdot (-1)^n}{2(6n+1)(6n+3)(6n+5)\pi^2} \cos(3(2n+1)\theta)\right)$$
$$n = 0, 1, 2, \ldots$$

Where $i_a$ is the magnitude of the current vector for the d-axis and q-axis, and is expressed by the following equation (12). $V_{ce0}$ [V] is the collector-emitter voltage when the collector Current i=0[A], and $V_{ce(sat)}$[V] is the collector-emitter voltage when the collector current i=$k_0$[A]. Here, D is the PWM rate and is expressed by the following equation (13). cos θ is the power factor and is expressed by the following equation (14). $V_{ce0}$[V] is the same as for the first embodiment and is calculated based upon equation (4). $V_{ce(sat)}$[V] is the same as for the first embodiment and is calculated based upon equation (5).

$$i_a = \sqrt{i_d^2 + i_q^2} \tag{12}$$

Here, $i_d$ is the d-axis current value and $i_q$ is the q-axis current value.

$$D = \frac{v_a}{\frac{V_{dc}}{\sqrt{2}}} \tag{13}$$

Where $v_a$ is the magnitude of the voltage vector for the d-axis and q-axis, and is expressed by the following equation (15). $V_{dc}$[V] is a direct-current voltage value applied to the semiconductor module.

$$\cos\theta = \frac{i_d v_d + i_q v_q}{i_a v_a} \tag{14}$$

Here, $v_d$ is the d-axis voltage value and $v_q$ is the q-axis voltage value.

$$v_a = \sqrt{v_d^2 + v_q^2} \tag{15}$$

Switching loss $P_{sw}$ for the second term in equation (1) can be expressed by the following equation (16).

$$P_{sw}\ [W] = f_c \cdot E_{sw(sat)} \cdot \frac{\sqrt{\frac{2}{3}}\, i_a}{k_1} \cdot \frac{1}{\pi} \tag{16}$$

where $f_c$[Hz] is switching frequency. $E_{sw(sat)}$[J] is switching loss when collector current i=$k_1$[A]. $E_{sw(sat)}$[J] is the same as for the first embodiment and is calculated based upon equation (7).

The temperature detection method carried out by the temperature detection device in the second embodiment is collected as follows.

(1) The semiconductor element temperature detector 8A in the temperature detection device calculates the heating value P[W] generated at the IGBT constituting the target of temperature detection (heat-generating (loss) model 10A), and calculates the temperature difference $\Delta T_j$ [° C.] between the cooling water temperature $T_w$ [° C.] circulating in the cooling system and the temperature $T_j$ [° C.] of the IGBT (thermal resistance model 11) based upon the thermal resistance R [° C./W] of the cooling system. The heating value P[W] is calculated based on the current values for the d-axis and the q-axis decided by the current controller 7, the voltage values for the d-axis and q-axis, the direct-current voltage values applied to the semiconductor module, and the IGBT temperature detected for the previous time (for example, 10 μsecs). It is also possible in the second embodiment to obtain the temperature of the IGBTs without providing temperature sensors directly at the IGBTs. As with the first embodiment, it is possible for the semiconductor module to be small and inexpensive even in cases for semiconductor modules where a plurality of IGBTs are combined.

(2) In the second embodiment, calculations are performed assuming that the IGBT temperature is substantially fixed during at least one period of the motor drive frequency. It is therefore not possible to obtain an accurate result when the rotational speed is not greater than the rotational speed decided based upon the time constant of the transient model. However, it is also possible to apply the lowest calculation period (for example, 50 msecs) decided based upon the time constant for the transient model up to the maximum rotational speed.

(3) Equation (4) and equation (5) a reset in such a manner that fluctuations in the heating value due to changes in the collector-emitter voltage $V_{ce}$ caused by changes in the temperature $T_j$ of the IGBT are compensated for while calculating the heating value P[W]. Further, equation (7) is set in such a manner as to correct fluctuations in the heating value due to changes in the switching loss $E_{sw(sat)}$ caused by changes in the temperatures $T_j$ of the IGBTs. As a result, as with the first embodiment, the precision of calculation of the temperature difference $\Delta T_j[° C.]$ is increased and the precision of calculating the temperature of the IGBT is also increased.

Third Embodiment

It is also possible for the temperature detection device in the first embodiment described above and the temperature detection device in the second embodiment to be switched according to the rotational speed of the motor 5 (rotational speed per unit time). In this case, temperature detection in the first embodiment is carried out in cases where the rotational speed of the motor 5 is lower than a prescribed speed, and temperature detection in the second embodiment is carried out when the rotational speed of the motor 5 is greater than a prescribed speed.

According to the third embodiment, regardless of the rotational speed of the motor 5, it is possible to apply the present inventions from low speeds to high speeds including cases where the motor becomes locked (rotational speed 0).

Fourth Embodiment

Figure 10:
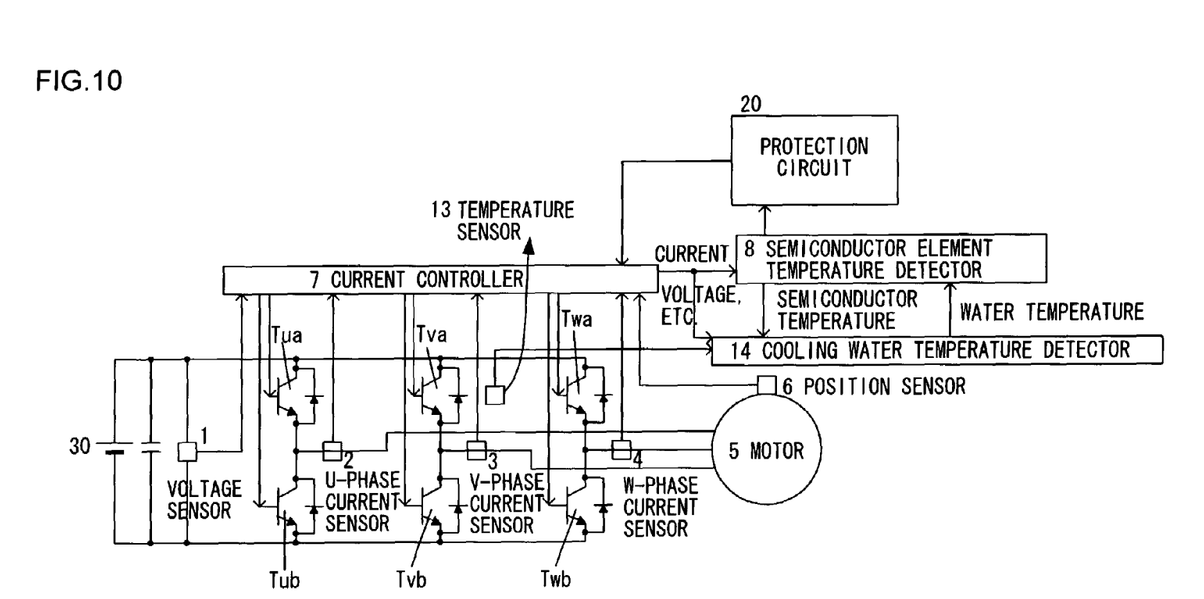
FIG. 10 is a structural view of the essential parts of a vehicle having a temperature detection device in a fourth embodiment according to the present invention.

It is also possible to calculate the cooling water temperature $T_w$ [° C.] based on temperatures other than that for the cooling water without water temperature sensors. FIG. 10 is a structural view describing the essential parts of a vehicle mounted with a temperature detection device in a fourth embodiment. In FIG. 10, the same numeral numbers are assigned to components similar to those shown in FIG. 1 and the detailed explanation is omitted. A distinction from FIG. 1 is that a temperature sensor 13 is provided in place of the water temperature sensor 9, and a cooling water temperature detector 14 is provided. The temperature sensor 13 detects the temperature of (for example, the position closest to IGBT Twa among the six IGBTs) the periphery of the semiconductor temperature module. The cooling water temperature detector 14 obtains the temperature of the cooling water by carrying out a prescribed calculation based on the temperature detected by the temperature sensor 13.

Figure 11:
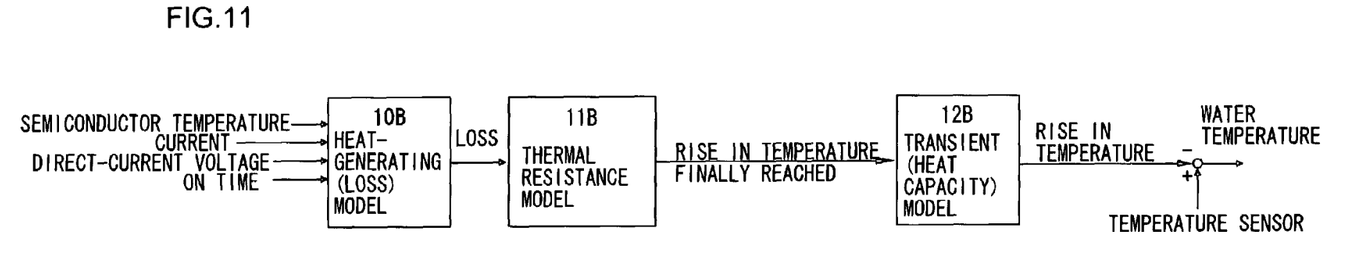
FIG. 11 is a block view illustrating a configuration for a cooling water temperature detector.

FIG. 11 is a block view illustrating a configuration for a cooling water temperature detector 14. In FIG. 11, the cooling water detector 14 includes a heat-generating (loss) model 10B, a thermal resistance model 11B and a transient (heat capacity) model 12B. The cooling water temperature detector 14 detects the temperature of the cooling water at the same period (for example, 100 μsecs) as the period in the first embodiment.

The heat-generating model 10B calculates the amount of heat generated at IGBT Twa, i.e. calculates loss $P_{Twa}[W]$ of the IGBT Twa. The operation processing is the same as the processing by the heat-generating (loss) model 10 in the first embodiment and a detailed description is therefore omitted.

The thermal resistance model 11B calculates the temperature difference $\Delta T'_{ww}$ [° C.] between the temperature $T_{13}$ [° C.] of the installation position of the temperature sensor 13 and the temperature $T_{ww}$ [° C.] of the cooling water based on the heating value $P_{Twa}[W]$ of IGBT Twa and the thermal resistance $R_{13}$ [° C./W] of the installation position of the temperature sensor 13. The thermal resistance $R_{13}$ [C/W] is measured in advance and stored in memory (not shown) within the cooling water temperature detector 14. The cooling water temperature detector 14 then refers to data stored in the memory using the heating value $P_{Twa}[W]$ calculated by the heat-generating (loss) model 10B and obtains thermal resistance R13 corresponding to the heating value $P_{Twa}[W]$.

The cooling water temperature detector 14 then calculates temperature difference $\Delta T'_{ww}$ [° C.] occurring due to the heating value $P_{Twa}[W]$ by performing the calculation of the following equation (17).

$$\Delta T'_{ww}[° C.]=R_{13}[° C./W] \times P_{Twa}[W] \tag{17}$$

The transient (heat capacity) model 12B calculates the temperature difference $\Delta T_{ww}$ [° C.] of the cooling water by compensating for the transient temperature characteristics of the temperature detection device occurring after applying current to the semiconductor module. $\Delta T_{ww}$ [° C.] is a value which is obtained by removing transitory influences after starting of current-applying from the calculated temperature difference $\Delta T'_{ww}$ [° C.].

Using the same procedure as for equation (9), the relationship between temperature difference $\Delta T_{ww}$ [° C.] of the cooling water and a temperature difference $\Delta T'_{ww}[° C.]$ including transient influences can be expressed in the following equation (18) using a Laplace operator.

$$\Delta T_{ww}(s) = \frac{d_2 s^2 + d_1 s + c_0}{s^2 + c_1 s + c_0} \Delta T'_{ww}(s) \tag{18}$$

where "s" is a Laplace operator, and $c_1$, $c_0$, $d_0$ and $d_1$ are coefficients obtained through experimentation. The cooling water temperature detector 14 substitutes the calculated temperature difference $\Delta T'_{ww}$ [° C.] into equation (18), and obtains a temperature difference $\Delta T_{ww}$ [° C.] which does not include transient influences.

The cooling water temperature detector 14 then adds the temperature $T_{13}$ [° C.] detected by the temperature sensor 13 and the temperature difference $\Delta T_{ww}$ [° C.] as shown in equation (19), so that at temperature $T_{ww}$ [° C.] of the cooling water is obtained.

$$T_{ww}[° C.]=T_{13}[° C.]+\Delta T_{ww}[° C.] \tag{19}$$

The cooling water temperature detector 14 then sends the obtained temperature $T_{ww}$ [° C.] to the semiconductor element temperature detector 8 in the first embodiment or the semiconductor element temperature detector 8A in the second embodiment. Further, the semiconductor element temperature detector 8 or the semiconductor element temperature detector 8A calculates the temperatures of the IGBTs taken as respect temperature detection targets using the cooling water temperature $T_{ww}[° C.]$ calculated by the cooling water temperature detector 14 in place of the cooling water temperature $T_w$ [° C.] detected by the cooling water sensor 9 in the first embodiment (or second embodiment) described above.

According to the temperature detection device in the fourth embodiment, a temperature sensor 13 for detecting the temperature in the vicinity of IGBT Twa in place of the water temperature sensor is provided, and cooling water temperature is obtained by calculation employing a temperature detected by the temperature sensor 13. It is therefore not necessary to arrange a water temperature sensor in the cooling water. As a result, leakage occurring at the water temperature sensor can be eliminated.

Fifth Embodiment

Figure 12:
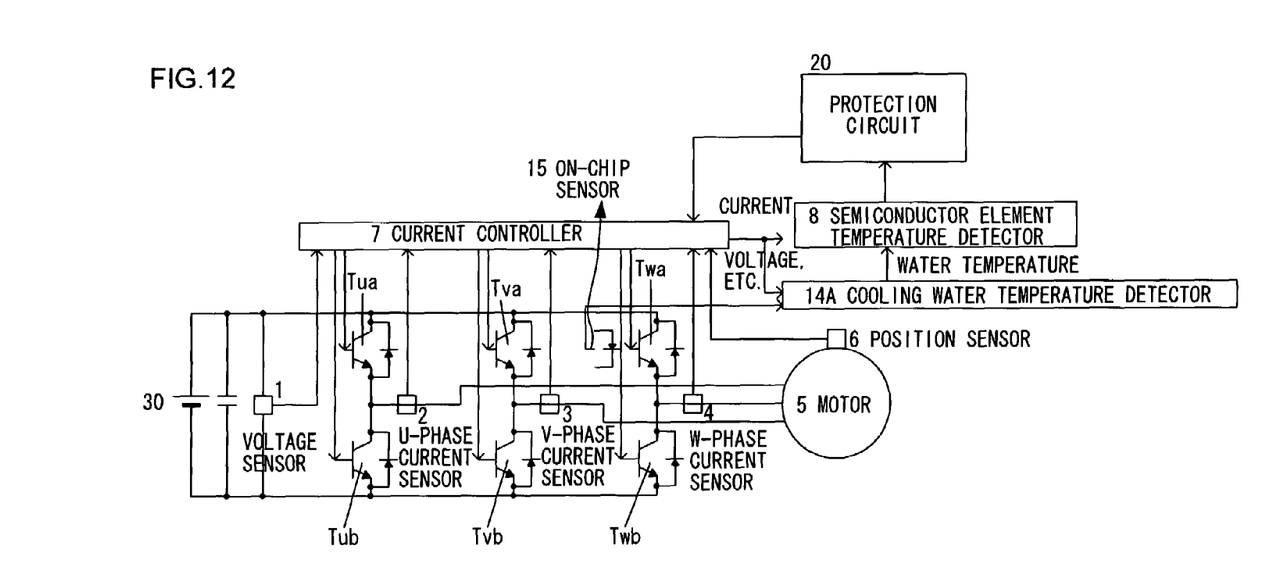
FIG. 12 is a structural view of the essential parts of a vehicle having a temperature detection device in a fifth embodiment according to the present invention.

In a fifth embodiment, a modified example that operates on the cooling water temperature $T_w$ [° C.] is given. FIG. 12 is a structural view of the essential parts of a vehicle mounted with a temperature detection device in a fifth embodiment. In FIG. 12, the same numeral numbers are assigned to components similar to those shown in FIG. 10 (the fourth embodiment) and the detailed explanation is omitted. A distinction from FIG. 10 is that an on-chip sensor 15 is provided in place of the water temperature sensor 13, and a cooling water temperature detector 14A is provided. The on-chip sensor 15 is arranged so as to detect the temperature at the center of the IGBT (for example, IGBT Twa) chip where the temperature is highest among the semiconductor temperature module. The cooling water temperature detector 14A obtains the temperature of the cooling water by carrying out a prescribed calculation based on the temperature detected by the on-chip sensor 15.

Figure 13:
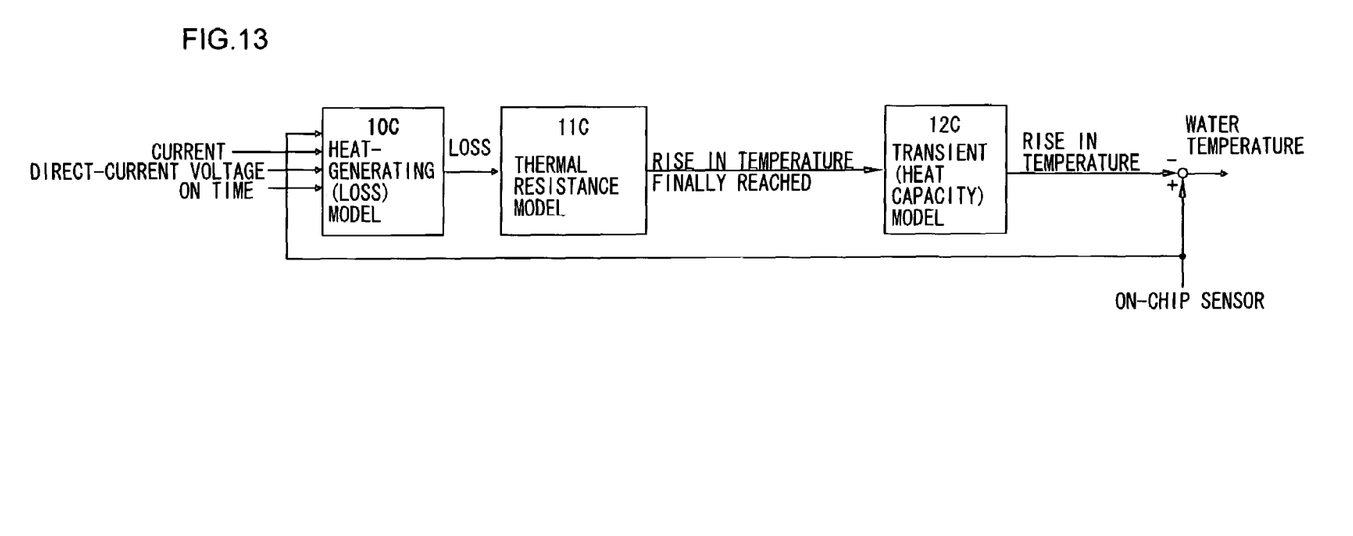
FIG. 13 is a block view illustrating a configuration for a cooling water temperature detector.

FIG. 13 is a block view illustrating a configuration for a cooling water temperature detector 14A. The cooling water detector 14A includes a heat-generating (loss) model 10C, a thermal resistance model 11C and a transient (heat capacity) model 12C. The cooling water temperature detector 14A detects the temperature of the cooling water at the same period (for example, 100 μsecs) as the period in the first embodiment.

The heat-generating model 10C calculates the amount of heat generated at IGBT Twa, i.e. calculates loss $P_{Twa}$[W] of the IGBT Twa. The operation processing is the same as the processing by the heat-generating (loss) model 10 in the first embodiment and a detailed description is therefore omitted. However, the chip temperature of IGBT Twa detected by the on-chip sensor 15 is used in place of the IGBT temperature detected for the previous time.

The thermal resistance model 11C calculates a temperature difference $\Delta T'_{ww}$ [° C.] between the temperature $T_{15}$ [° C.] detected by the on-chip sensor 15 and the temperature $T_{ww}$ [° C.] of the cooling water based upon the heating value $P_{Twa}$ [W] of the IGBT Twa and the thermal resistance $R_{15}$ [° C./W] of the cooling system. The thermal resistance $R_{15}$ [° C./W] is measured in advance and measurement data is stored in memory (not shown) within the cooling water temperature detector 14A. The cooling water temperature detector 14A then refers to data stored in the memory using the heating value $P_{Twa}$[W] calculated by the heat-generating (loss) model 10C and obtains thermal resistance R15 corresponding to the heating value $P_{Twa}$[W].

The cooling water temperature detector 14A then calculates temperature difference $\Delta T'_{ww}$ [° C.] occurring due to the heating value $P_{Twa}$[W] by performing the calculation of the following equation (20).

$$\Delta T'_{ww}[° C.] = R_{15}[° C./W] \times P_{Twa}[W] \quad (20)$$

The transient (heat capacity) model 12C calculates the temperature difference $\Delta T_{ww}$ [° C.] of the cooling water by compensating for the transient temperature characteristics of the temperature detection device occurring after applying current to the semiconductor module. $\Delta T_{ww}$ [° C.] is a value which does not include transitory influences after starting of current-applying from the calculated temperature difference $\Delta T'_{ww}$ [° C.].

Using the same procedure as for equation (9), the temperature difference $\Delta T_{ww}$ [° C.] of the cooling water and a temperature difference $\Delta T'_{ww}$ [° C.] including transient influences can be expressed in equation (18) above using a Laplace operator. The actual value for the coefficient is different to the case in the fourth embodiment. The cooling water temperature detector 14A substitutes the calculated temperature difference $\Delta T'_{ww}$ [° C.] into equation (18), and obtains a temperature difference $\Delta T_{ww}$ [° C.] which does not include transient influences.

The cooling water temperature detector 14A then adds the temperature $T_{15}$ [° C.] detected by the on-chip sensor 15 and the temperature difference $\Delta T_{ww}$ [° C. ] as shown in equation (21), so that a temperature $T_{ww}$ [° C.] for the cooling water is obtained.

$$T_{ww}[° C.] = T_{15}[° C.] + \Delta T_{ww}[° C.] \quad (21)$$

The cooling water temperature detector 14C then sends the obtained temperature $T_{ww}$ [° C.] to the semiconductor element temperature detector 8 in the first embodiment or the semiconductor element temperature detector 8A in the second embodiment. Further, the semiconductor element temperature detector 8 or the semiconductor element temperature detector 8A calculates the temperatures of the IGBTs taken as temperature detection targets using the cooling water temperature $T_{ww}$[° C.] calculated by the cooling water temperature detector 14 in place of the detection water temperature $T_w$ [° C.] detected by the cooling water sensor 9 in the first embodiment (or second embodiment) described above.

According to the fifth embodiment, an on-chip sensor 15 for detecting the chip temperature of IGBT Twa in place of the water temperature sensor is provided, and cooling water temperature is obtained by calculation employing the temperature detected by the on-chip sensor 15. It is therefore not necessary to arrange a water temperature sensor, as in the fourth embodiment.

In the fifth embodiment, the semiconductor element temperature detector 8 (or the semiconductor element temperature detector 8A) using the calculated cooling water temperature in calculations omits temperature detection calculations for the IGBT (in this example, the IGBT Twa) where the on-chip sensor 15 is provided. Namely, the temperature detected by the on-chip sensor 15 may be used as the temperature of the IGBT Twa.

Further, in the fifth embodiment, the semiconductor element temperature detector 8A which performs calculation using the calculated cooling water temperature may omit performing the temperature detection operation for each IGBT only in the case where the motor 5 is rotating (not locked). In the event that the motor 5 is rotating, the IGBT within the semiconductor temperature module for which the temperature is highest is the same (in this example, IGBT Twa). The temperature of other IGBTs can therefore be regarded as normal with the proviso that the temperature of IGBT Twa (the maximum temperature) is not an abnormal temperature.

The above described embodiments are examples, and various modifications can be made without departing from the spirit and scope of the invention. For example, in the above description, a description is given of an example for detecting the temperature of IGBT in the case of a water cooling system but the present invention may also be applied to cases of other cooling systems using a cooling medium such as gas or oil.

A description is given of an example of detecting temperature of an IGBT but this is by no means limiting and the present invention may also be applied to cases of detecting the temperature of circuit elements that are turned on and off.

The present invention can also be applied to cases (, for example, cases where the detection temperature is extremely high, the temperature detection subject is extremely small, the temperature detection subject is complex in shape, and temperature detection subjects in atmospheres where the temperature sensor cannot be arranged) where temperature sensors cannot be directly installed at a temperature detection subject (in the above example, an IGBT).

In the above description, a description is given where a two-dimensional table for a resistor R1 and a resistor R2 is prepared in the semiconductor element temperature detector 8. It is preferable for a two-dimensional table to be prepared for each IGBT, but it is also possible for a two-dimensional table for a typical IGBT to be used in operations for all of the IGBTs. A typical IGBT is taken to be an IGBT for which the temperature is the highest (i.e. the thermal resistance value is a maximum) within the semiconductor module.

A program for carrying out a temperature detection operation at the semiconductor element temperature detector 8 (8A) is prepared, and this program can be read-in at a personal computer etc. for use as a temperature detection device. In this case, a temperature detection device is constructed by loading the program into a data storage device of the personal computer and executing the program. Loading of the program may be achieved by installing a recording medium storing the program in a personal computer, or loading a program into a personal computer via a network.

Figure 14:
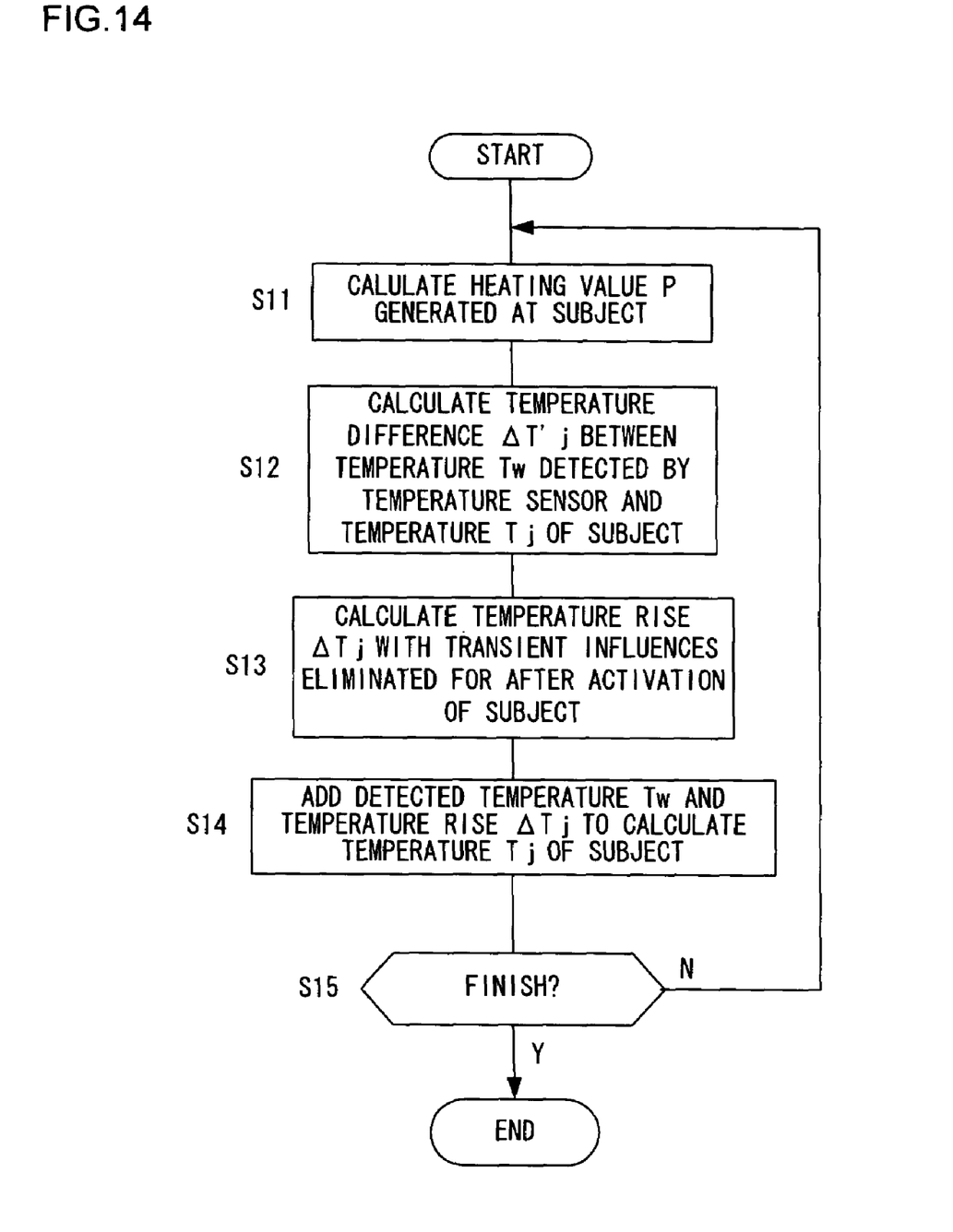
FIG. 14 is a flowchart illustrating the flow of temperature detection program processing.

FIG. 14 is a flowchart illustrating the flow of temperature detection program processing. In step S11, the computer device calculates the heating value P[W] generated at the target (IGBT) of temperature detection, and the operation proceeds to step S12.

In step S12, the computer device calculates the temperature difference $\Delta T'_j$ [° C.] between the temperature (water temperature $T_w$ [° C.]) detected by the temperature sensor (water temperature sensor 9) and the temperature $T_j$ [° C.] of the target (IGBT) of temperature detection based on the heating value P[W] and the thermal resistance R [° C./W] of the cooling system.

In step S13 following step S12, the computer device calculates the temperature rise $\Delta T_j$ [° C.] which does not include transient influences after activation of the subject of detecting temperature (after current-applying), and the operation proceeds to step S14.

In step S14, the computer device adds together the temperature (water temperature $T_w$ [° C.]) detected by the temperature sensor (water temperature sensor 9) and the temperature rise $\Delta T_j$ [° C.] which does not include transient influences so as to calculate the temperature $T_j$ [° C.] of the subject. When the temperature $T_j$ [° C.] of the subject is calculated, then the operation proceeds to step S15.

In step S15, the computer device determines whether or not processing is complete. When a completion operation is carried out, the computer device makes a positive determination in step S15 and the processing of flowchart shown in FIG. 14 ends. On the other hand, when the completion operation is not carried out, the operation returns to step S11.

Figure 15:
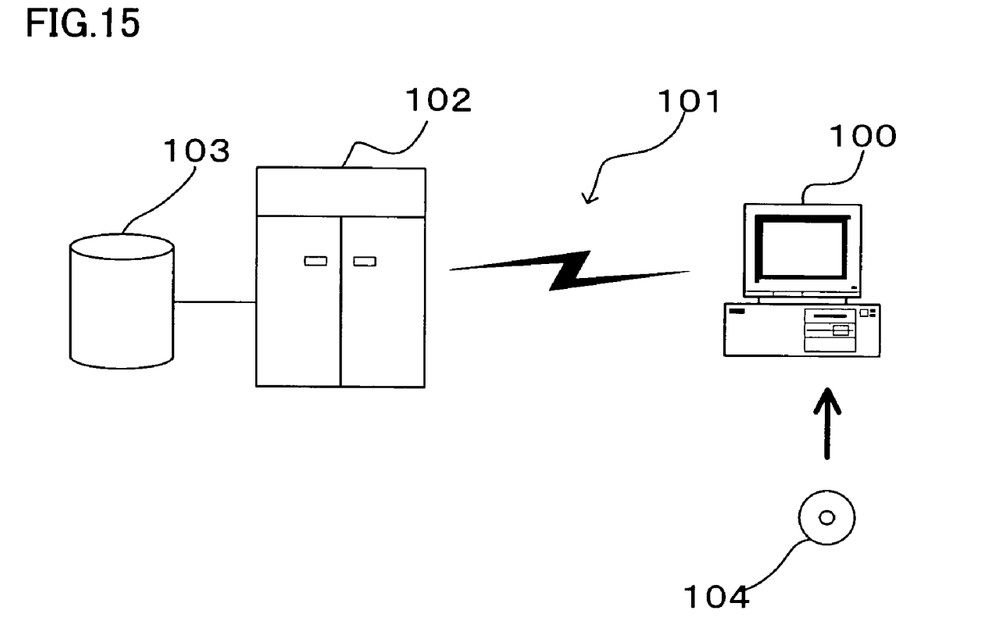
FIG. 15 shows how a control program is provided to a personal computer.

When the present invention is adopted in a personal computer or the like, the control program may be provided in a recording medium such as a CD-ROM or a DVD-ROM or as a data signal on the Internet or the like. FIG. 15 shows how this may be achieved. A personal computer 100 receives the program via a CD-ROM 104. In addition, the personal computer 100 has a function that allows it to be connected with a communication line 101. A computer 102 is a server computer that provides the program stored in a recording medium such as a hard disk 103. The communication line 101 may be a communication line for Internet communication, personal computer communication or the like, or it may be a dedicated communication line. The computer 102 reads out the program from the hard disk 103 and transmits the program to the personal computer 100 via the communication line 101. Namely, the program is embodied as a data signal on a carrier wave and is transmitted via the communication line 101. In other words, the program can be distributed as a computer-readable computer program product adopting any of various modes such as a recording medium and a carrier wave.

The disclosure of the following priority application is herein incorporated by reference:

Japanese Patent Application No. 2004-81572, filed Mar. 19, 2004.

What is claimed is:

1. A temperature detection device comprising:
a cooling medium temperature calculation device that is configured to calculate a temperature of a cooling medium in a cooling system in which a temperature detection subject driven at a prescribed driving ratio is cooled;
a heat calculation device that is configured to calculate an amount of heat at the temperature detection subject based on drive information for the temperature detection subject;
a temperature calculation device that is configured to calculate a temperature of the temperature detection subject based on the amount of heat calculated by the heat calculation device, a thermal resistance between the temperature detection subject and the cooling medium, and the temperature of the cooling medium calculated by the cooling medium temperature calculation device;
a correction device that is configured to correct the amount of heat calculated by the heat calculation device using a temperature of the temperature detection subject calculated in a previous calculation period by the temperature calculation device;
wherein the temperature calculation device is configured to calculate a temperature of the temperature detection subject based on the amount of heat corrected by the correction device, the thermal resistance, and the temperature of the cooling medium;
a current detection device that is configured to detect a value of current flowing through the temperature detection subject; and
a voltage detection device that is configured to detect a value of voltage applied to the temperature detection subject;
wherein the current value detected by the current detection device, the voltage value detected by the voltage detection device, and drive ratio information for the temperature detection subject are configured to be contained in the drive information for the temperature detection subject.

2. A temperature detection device comprising:
a cooling medium temperature calculation device that is configured to calculate a temperature of a cooling medium in a cooling system in which a temperature detection subject driven at a prescribed driving ratio is cooled;

a heat calculation device that is configured to calculate an amount of heat at the temperature detection subject based on drive information for the temperature detection subject;

a temperature calculation device that is configured to calculate a temperature of the temperature detection subject based on the amount of heat calculated by the heat calculation device, a thermal resistance between the temperature detection subject and the cooling medium, and the temperature of the cooling medium calculated by the cooling medium temperature calculation device;

a correction device that is configured to correct the amount of heat calculated by the heat calculation device using a temperature of the temperature detection subject calculated in a previous calculation period by the temperature calculation device;

wherein the temperature calculation device is configured to calculate a temperature of the temperature detection subject based on the amount of heat corrected by the correction device, the thermal resistance, and the temperature of the cooling medium;

a voltage detection device that is configured to detect a value of voltage applied to the temperature detection subject, wherein:

the voltage value detected by the voltage detection device and vector control information for the temperature detection subject are configured to be contained in the drive information of the temperature detection subject, with the vector control information for the temperature detection subject including current values for a d-axis and a q-axis and voltage values for a d-axis and a q-axis.

3. A temperature detection device comprising:

a first temperature detection device as disclosed in claim 1 that is configured to calculate the temperature of the temperature detection subject which is driven to be switched in such a manner as to generate alternating-current power for supply to an alternating-current motor;

a second temperature detection device comprising a voltage detection device that is configured to detect a value of voltage applied to the temperature detection subject, wherein the voltage value detected by the voltage detection device and vector control information for the temperature detection subject are configured to be contained in the drive information of the temperature detection subject, with the vector control information for the temperature detection subject including current values for a d-axis and a q-axis and voltage values for a d-axis and a q-axis, the second temperature detection device being configured to calculate the temperature of the temperature detection subject; and a control device that is configured to select the temperature calculated by the first temperature detection device when the rotational speed of the alternating-current motor is lower than a prescribed speed and is configured to select the temperature calculated by the second temperature detection device when the rotational speed is greater than the prescribed speed.

4. The temperature detection device according to claim 1, wherein:

the cooling medium temperature calculation device is configured to detect a temperature of the surroundings of the temperature detection subject and is configured to calculate a temperature of the cooling medium based on the current value detected by the current detection device, the voltage value detected by the voltage detection device, drive ratio information for the temperature detection subject, the thermal resistance between a position at which temperature is detected and the cooling medium, and the detected surrounding temperature.

5. The temperature detection device according to claim 2, wherein:

the cooling medium temperature calculation device is configured to detect a temperature of the surroundings of the temperature detection subject and is configured to calculate a temperature of the cooling medium based on the voltage value detected by the voltage detection device, the vector control information for the temperature detection subject, the thermal resistance between a position at which temperature is detected and the cooling medium and the detected surrounding temperature.

6. The temperature detection device according to claim 1, wherein:

a plurality of temperature detection subjects exist, and the cooling medium temperature calculation device is configured to detect a temperature of one temperature detection subject among a plurality of temperature detection subjects and is configured to calculate the temperature of the cooling medium based on the current value detected by the current detection device, the voltage value detected by the voltage detection device, the drive ratio information for the temperature detection subject, the thermal resistance between a position at which temperature is detected and the cooling medium, and the detected temperature of the temperature detection subject.

7. The temperature detection device according to claim 2, wherein:

a plurality of temperature detection subjects exist, and the cooling medium temperature calculation device is configured to detect a temperature of one temperature detection subject among the plurality of temperature detection subjects and is configured to calculate the temperature of the cooling medium based on the voltage value detected by the voltage detection device, the vector control information for the temperature detection subject, the thermal resistance between a position at which temperature is detected and the cooling medium, and the detected temperature of the temperature detection subject.

8. The temperature detection device according to claim 6, wherein:

the cooling medium temperature calculation device is configured to detect the temperature of the temperature detection subject with the highest temperature among the plurality of temperature detection subjects.

9. The temperature detection device according to claim 7, wherein:

the cooling medium temperature calculation device is configured to detect the temperature of the temperature detection subject with a highest temperature among the plurality of temperature detection subjects.

10. A temperature detection device comprising:

a cooling medium temperature calculation means for calculating a temperature of a cooling medium in a cooling system in which a temperature detection subject driven at a prescribed driving ratio is cooled;

a heat calculation means for calculating an amount of heat at the temperature detection subject based on drive information for the temperature detection subject;

a temperature calculation means for calculating a temperature of the temperature detection subject based on the amount of heat calculated by the heat calculation means, the thermal resistance between the temperature detection subject and the cooling medium, and the temperature of the cooling medium calculated by the cooling medium temperature calculation means;

a correction means for correcting the amount of heat calculated by the heat calculation means based on a temperature of the temperature detection subject calculated in a previous calculation period by the temperature calculation means;

wherein the temperature calculation means is configured to calculate a temperature of the temperature detection subject based on the amount of heat corrected by the correction means, the thermal resistance, and the temperature of the cooling medium;

a current detection means for detecting a value of current flowing through the temperature detection subject; and a voltage detection means for detecting a value of voltage applied to the temperature detection subject;

wherein: the current value detected by the current detection means, the voltage value detected by the voltage detection means, and a drive ratio information for the temperature detection subject are configured to be contained in the drive information for the temperature detection subject.

* * * * *